United States Patent
Kim et al.

(10) Patent No.: US 10,686,575 B2
(45) Date of Patent: Jun. 16, 2020

(54) METHOD AND APPARATUS FOR WIRELESS COMMUNICATION USING MODULATION, CODING SCHEMES, AND TRANSPORT BLOCK SIZES

(71) Applicant: SAMSUNG ELECTRONICS CO., LTD., Suwon-si, Gyeonggi-Do (KR)

(72) Inventors: Jeong-hun Kim, Hwaseong-si (KR); Yang-soo Kwon, Seoul (KR); Min-goo Kim, Hwaseong-si (KR); In-hyoung Kim, Yongin-si (KR); Joo-hyun Do, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/015,945

(22) Filed: Jun. 22, 2018

(65) Prior Publication Data
US 2018/0375630 A1 Dec. 27, 2018

(30) Foreign Application Priority Data

Jun. 23, 2017 (KR) .................. 10-2017-0079957
Dec. 20, 2017 (KR) .................. 10-2017-0176248

(51) Int. Cl.
*H04L 5/00* (2006.01)
*H04W 72/04* (2009.01)
*H04L 27/00* (2006.01)

(52) U.S. Cl.
CPC ......... *H04L 5/0053* (2013.01); *H04W 72/042* (2013.01); *H04L 5/001* (2013.01); *H04L 27/0012* (2013.01)

(58) Field of Classification Search
CPC ... H04L 5/0053; H04L 27/0012; H04L 5/001; H04L 1/0013; H04W 72/042; H04W 28/22

See application file for complete search history.

(56) References Cited

U.S. PATENT DOCUMENTS

| 8,824,406 B2 | 9/2014 | Sabella et al. |
| 9,312,988 B2 | 4/2016 | Singh et al. |
| 9,432,972 B2 | 8/2016 | Imamura et al. |
| 9,614,654 B2 | 4/2017 | Gaal |
| 2010/0195614 A1* | 8/2010 | Nimbalker ........ H04W 72/1289 370/330 |
| 2013/0329661 A1 | 12/2013 | Chen et al. |

(Continued)

FOREIGN PATENT DOCUMENTS

| JP | 5491642 | 5/2014 |
| JP | 6042505 | 12/2016 |
| JP | 2017-041859 | 2/2017 |

*Primary Examiner* — Christine Ng
(74) *Attorney, Agent, or Firm* — F. Chau & Associates, LLC

(57) ABSTRACT

A method of processing a signal received over a wireless link may utilize sharing of Modulation and Coding Scheme (MCS) and Transport Block Size (TBS) data. At least one parameter is obtained including a sub-carrier spacing of a transport format. A modulation order and a transport block size may be detected, based on the at least one parameter. The signal received over the wireless link is then processed, based on the detected modulation order and the transport block size. An apparatus may perform the embodiments of the method to process the received signal.

12 Claims, 10 Drawing Sheets

(56) References Cited

U.S. PATENT DOCUMENTS

| | | | |
|---|---|---|---|
| 2014/0169297 A1* | 6/2014 | Kim | H04L 5/0092 |
| | | | 370/329 |
| 2015/0215068 A1 | 7/2015 | Wu | |
| 2015/0312082 A1 | 10/2015 | Shin et al. | |
| 2017/0111887 A1 | 4/2017 | Hong et al. | |
| 2017/0311326 A1* | 10/2017 | Wong | H04W 72/0453 |
| 2018/0035429 A1* | 2/2018 | Jiaqing | H04W 72/0446 |
| 2018/0092002 A1* | 3/2018 | Manolakos | H04L 5/0007 |
| 2018/0241500 A1* | 8/2018 | Takeda | H04W 16/28 |

* cited by examiner

FIG. 3B

T_TBS

| LTBS | N_PRB | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| ⋮ | ⋮ | ⋮ | ⋮ | ⋮ | ⋮ | ⋮ | ⋮ | ⋮ | ⋮ | ⋮ |

FIG. 6

| MCS Index (LMCS) | Modulation Order (MO) | | | | | TBS Index (LTBS) | | | | |
|---|---|---|---|---|---|---|---|---|---|---|
| Sub-Carrier Spacing (SCS) | 15 kHz | 30 kHz | 60 kHz | 120 kHz | 240 kHz | 15 kHz | 30 kHz | 60 kHz | 120 kHz | 240 kHz |
| 0 | 2 | 2 | 2 | 2 | 2 | 0 | 0 | 0 | 0 | 0 |
| 1 | 2 | 2 | 2 | 2 | 2 | 1 | 1 | 1 | 1 | 1 |
| 2 | 2 | 2 | 2 | 2 | 2 | 2 | 2 | 2 | 2 | 2 |
| 3 | 2 | 2 | 2 | 2 | 2 | 3 | 3 | 3 | 3 | 3 |
| 4 | 2 | 2 | 2 | 2 | 2 | 4 | 4 | 4 | 4 | 4 |
| 5 | 2 | 2 | 2 | 2 | 2 | 5 | 5 | 5 | 5 | 5 |
| 6 | 2 | 2 | 2 | 2 | 4 | 6 | 6 | 6 | 6 | 6 |
| 7 | 2 | 2 | 2 | 4 | 4 | 7 | 7 | 7 | 7 | 6 |
| 8 | 2 | 2 | 4 | 4 | 2 | 8 | 8 | 8 | 7 | 6 |
| 9 | 2 | 4 | 4 | 4 | 2 | 9 | 9 | 8 | 7 | 6 |
| 10 | 4 | 4 | 4 | 4 | 4 | 10 | 9 | 8 | 7 | 6 |
| ... | ... | ... | ... | ... | ... | ... | ... | ... | ... | ... |

T_MCS'

METHOD AND APPARATUS FOR WIRELESS COMMUNICATION USING MODULATION, CODING SCHEMES, AND TRANSPORT BLOCK SIZES

CROSS-REFERENCE TO RELATED APPLICATIONS

This application claims the benefit of priority from Korean Patent Application Nos. 10-2017-0079957, filed on Jun. 23, 2017 and 10-2017-0176248, filed on Dec. 20, 2017, in the Korean Intellectual Property Office, the disclosures of which are incorporated by reference herein in their entireties.

TECHNICAL FIELD

Embodiments of the inventive concept relate to a wireless communication method and apparatus using Modulation and Coding Schemes (MCS), and Transport Block Sizes (TBS). More particularly, embodiments of the inventive concept relate to ways of sharing MCS and TBS parameters.

DISCUSSION OF THE RELATED ART

Modern wireless communication systems may be designed to support a flexible communication configuration that may adaptively change the data throughput according to a particular communication environment. A transmitting side and a receiving side of a communication system may commonly recognize a specific communication configuration from among a plurality of communication configurations and communicate with each other according to the specifically recognized communication configuration. An overhead required for sharing the communication configuration between the transmitting side and the receiving side may occur. As each of the wireless communication systems evolve, more and more communication configurations are defined, and thus the overhead utilized for sharing the communication configurations may increase. Although there is increased flexibility when a particular wireless communication system supports various communication configurations, reducing the overhead utilized for sharing the communication configurations may be a factor to increase efficiency of the wireless communication system.

SUMMARY

Embodiments of the inventive concept provides a method and apparatus for wireless communication that efficiently shares various communication configurations in a wireless communication system.

According to an embodiment of the inventive concept, there is provided a method of processing a signal received over a wireless link including obtaining at least one parameter including sub-carrier spacing; detecting a modulation order and a transport block size, based on the at least one parameter; and processing the received signal, based on the detected modulation order and the transport block size.

According to an embodiment of the inventive concept, there is provided a method of processing a signal received over a wireless link including obtaining downlink control information; extracting at least one field corresponding to at least one of a modulation order, a physical resource block count, and a transport block size from the downlink control information; identifying at least one value of the modulation order, the physical resource block count, and the transport block size, based on a value of the extracted at least one field; and processing the received signal, based on the identified at least one value.

The identifying of the transport block size includes calculating the transport block size from the value of the first field, based on a predefined function, and the predefined function comprises a monotone increasing function having a part with a slope greater than 1.

According to an embodiment of the inventive concept, there is provided a method of processing a signal received over a wireless link including obtaining an adjustment indicator indicating a change of a value of at least one of a modulation order and a transport block size index; updating the modulation order and the transport block size index by changing the value of the at least one of the modulation order and the transport block size index in response to the adjustment indicator; and processing the received signal, based on the updated modulation order and the updated transport block size index.

According to an embodiment of the inventive concept, there is provided a wireless communication apparatus including a processor; and a memory accessed by the processor and storing a plurality of instructions executed by the processor to perform the wireless communication method.

According to an embodiment of the inventive concept A wireless communication apparatus includes an application specific integrated circuit (ASIC); an application specific instruction set processor (ASIP) in communication with the ASIC; a main processor configured to control the ASIC and ASIP; a first memory coupled to the ASIP that stores at least instructions executed by the ASIP; and a second memory comprising a main memory coupled to the main processor and stores instructions executed by the main processor; at least one antenna that receives wireless signals over a downlink and transmits signals over an uplink; and a transceiver configured to receive and amplify the signals received from the at least one antenna, and shift the amplified signals from a radio frequency (RF) band to a baseband, and provide the shifted signals to a signal processor in communication with the main processor, and the transceiver configured to shift signals provided from the signal processor in communication with the main processor from a baseband to an RF band, amplify the shifted signals, and provide the amplified signals to the antenna for transmission. The main processor is configured to obtain at least one parameter of a received signal comprising a sub-carrier spacing of a transport format, detect a modulation order and/or a transport block size, based on the at least one parameter of the received signal; and process the received signal, based on at least one of the detected modulation order and the transport block size.

BRIEF DESCRIPTION OF THE DRAWINGS

Embodiments of the inventive concept will be more appreciated by a person of ordinary skill in the art with reference to the attached drawings, in which:

FIGS. 3A and 3B illustrate examples of a table used to share a transport format in a Long Term Evolution (LTE) system;

FIG. 6 is a diagram illustrating an example of a table of FIG. 5 in accordance with an example embodiment of the inventive concept;

DETAILED DESCRIPTION OF THE EMBODIMENTS

The following detailed description is provided to assist a person of ordinary skill in the art in gaining a comprehensive understanding of the methods, apparatuses, and/or systems described herein to practice the appended claims without undue experimentation. A person of ordinary skill in the art should understand that various changes, modifications, and equivalents of the systems, apparatuses, and/or methods described herein may be made without departing from the scope of the scope of embodiments of the inventive concept. Descriptions of functions and constructions that are well-known to one of ordinary skill in the art may be omitted for increased clarity and conciseness.

Figure 1:
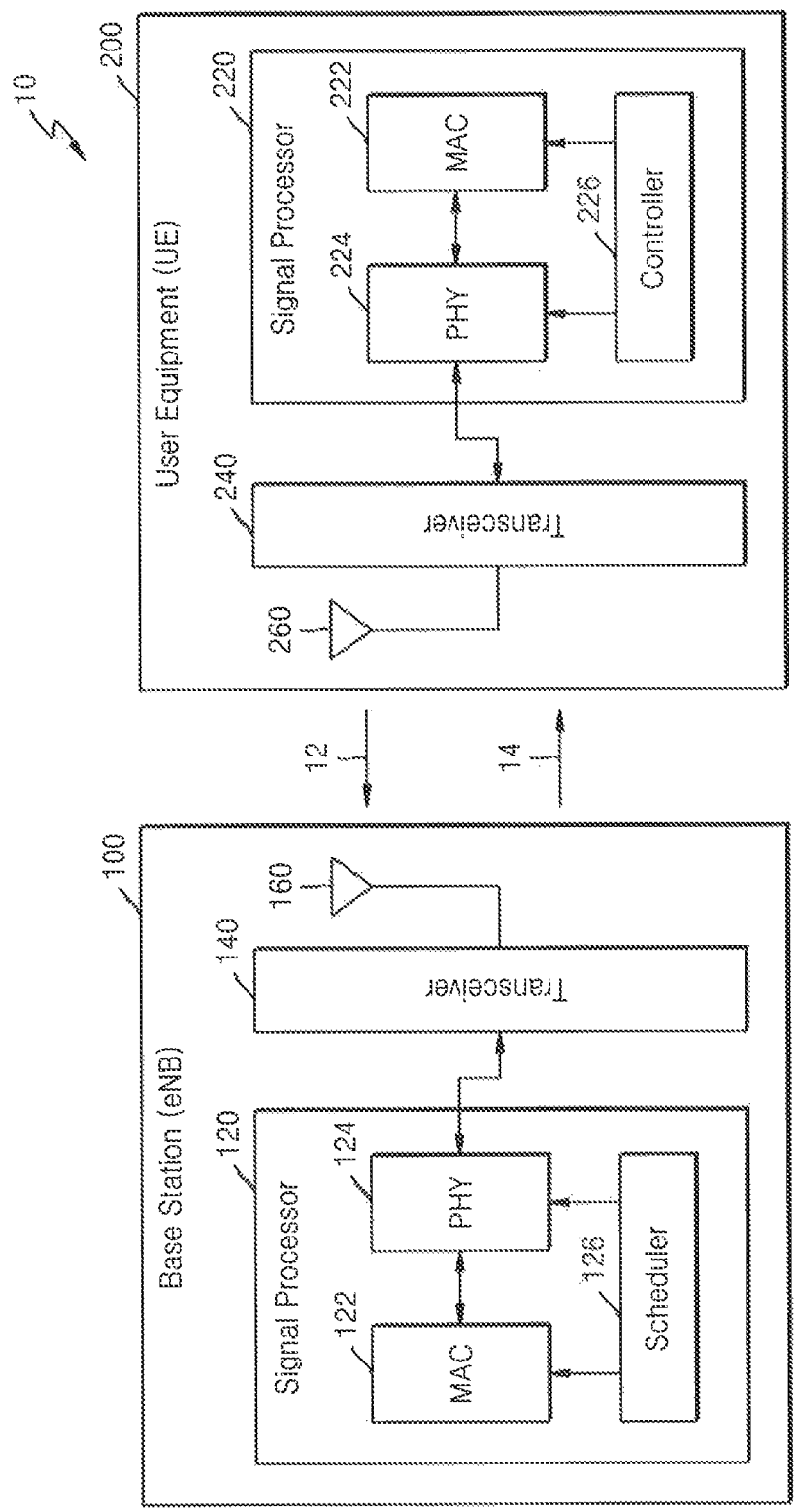
FIG. 1 is a block diagram illustrating a wireless communication system including a base station and user equipment, in accordance with an example embodiment of the inventive concept.

FIG. 1 is a block diagram illustrating a wireless communication system 10 including a base station 100 and user equipment 200 in accordance with an example embodiment of the inventive concept. The wireless communication system 10 may include, but is not limited to, a 5th generation (5G) wireless system, a Long Term Evolution (LTE) system, an LTE-Advanced system, a Code Division Multiple Access (CDMA) system, a Global System for Mobile Communications (GSM) system, a Wireless Local Area Network (WLAN) system or any other wireless communication system. Hereinafter, a person of ordinary skill in the art is to understand that although the wireless communication system 10 is mainly described with reference to the 5G system and/or the LTE system, the example embodiments of the inventive concept are not limited thereto.

The base station 100 may be generally referred to as a fixed station that communicates with the user equipment 200 and/or another base station and may communicate with the user equipment 200 and/or another base station to exchange data and control information. For example, the base station 100 may be referred to as a Node B, an evolved Node B (eNB), a sector, a site, a Base Transceiver System (BTS), an Access Point (AP), a Relay Node, Remote Radio H-lead (RRH), a radio unit (RU), a small cell, or the like. In the present specification, the base station 100 or cell may be construed as having a comprehensive meaning indicating some areas or functions covered by a Base Station Controller (BSC) in CDMA, Node-B in WCDMA, eNB in LTE or a sector (a site) and may include various coverage areas such as a: megacell, macrocell, microcell, picocell, femtocell and relay node, RRH, RU, small cell communication range, and the like.

The user equipment 200, which is a wireless communication device, may be referred to as various devices that may be fixed or mobile and may communicate with the base station 100 to transmit and receive data and/or control information. For example, the user equipment 200 may be referred to as terminal equipment, a mobile station (MS), a mobile terminal (MT), a user terminal (UT), a subscriber station (SS), a wireless device, a handheld device, or the like. The aforementioned list is not a limit on the types of devices that may be a user equipment 200.

A wireless communication network between the base station 100 and the user equipment 200 may support communication of multiple users by sharing available network resources. For example, in the wireless communication network, information may be transferred through various multiple access methods such as a code division multiple access (CDMA), a frequency division multiple access (FDMA), a time division multiple access (TDMA), an orthogonal frequency division multiple access (OFDMA), Single Carrier Frequency Division Multiple Access (SC-FDMA), OFDM-FDMA, OFDM-TDMA, OFDM-CDMA, and the like. Other multiple access protocols, other than those discussed herein above, may also be used.

As shown in FIG. 1, the base station 100 and the user equipment 200 may communicate with each other through an uplink UL 12 and a downlink DL 14. In a wireless system such as, for example, an LTE system and/or an LTE-Advanced system, the downlink DL 14 and the uplink UL 12 may transmit control information through a control channel such as a Physical Downlink Control Channel (PDCCH), a Physical Control Format Indicator Channel (PCFICH), a Physical Hybrid ARQ Indicator Channel (PHICH), a Physical Uplink Control Channel (PUCCH), an Enhanced Physical Downlink Control Channel (EPDCCH), etc. and may transmit data through a data channel such as a Physical Uplink Shared Channel (PDSCH), a Physical Uplink Shared Channel (PUSCH), etc. The control information may also be transmitted using an EPDCCH (enhanced PDCCH or extended PDCCH).

As discussed herein, the transmitting and receiving of a signal through a physical control channel such as the PUCCH, the PUSCH, the PDCCH, the EPDCCH, or the PDSCH may be expressed as "transmitting and receiving the PUCCH, the PUSCH, the PDCCH, the EPDCCH and the PDSCH". Also, the transmitting or receiving the PDCCH or transmitting or receiving a signal through the PDCCH may include transmitting or receiving the EPDCCH or transmitting or receiving the signal through the EPDCCH. For example, the PDCCH may be the PDCCH or the EPDCCH, and may include both the PDCCH and the EPDCCH.

Referring to FIG. 1, the base station 100 may include a signal processor 120, a transceiver 140, and an antenna 160. In some embodiments of the inventive concept, the transceiver 140 may include a filter, a mixer, a power amplifier (PA), and a low noise amplifier (LNA). The transceiver 140 may transmit signals through the antenna 160 and the downlink DL 14 that is to be received by the user equipment. For example, the transceiver 140 may shift a signal provided from the signal processor 120 from a baseband to a radio frequency (RF) band, for example, through the mixer, amplify the shifted signal, for example, by the PA, and provide the amplified signal to the antenna 160 for transmission. The transceiver 140 may also process signals received through the uplink UL 12 and the antenna 160 and may provide the processed signals to the signal processor 120. For example, the transceiver 140 may amplify the signal received via the antenna 160, e.g., through the LNA, shift the amplified signal from the RF band to a baseband, e.g., through the mixer, and provide the shifted signal to the signal processor 120.

With further regard to the base station 100, the signal processor 120 may include a Medium Access Control (MAC) block 122, a physical (PHY) block 124, and a scheduler 126. The MAC block 122 and the PHY block 124 may perform operations corresponding to a MAC layer and a PHY layer (or a physical layer) of the wireless communication system 10, respectively. For example, the MAC block 122 may perform logic-channel multiplexing, Hybrid Automatic Repeat and Request HARQ retransmission, scheduling of the uplink UL 12 and the downlink DL 14, and Carrier Aggregation CA control, etc. The PHY block 124 may also receive a transport block from the MAC block 122 for the downlink DL 14, and may perform cyclic redundancy correction CRC insertion, encoding, rate matching, scrambling, modulation, and antenna mapping, and so on. Although shown as separated in FIG. 1, in some embodiments of the inventive concept, the MAC block 122 and the PHY block 124 may be implemented as a unit.

The scheduler 126 may control the MAC block 122 and the PHY block 124. The scheduler 126 may determine a communication configuration for communication with the user equipment 200 based on the states of the uplink UL 12 and the downlink DL 14 and the states of links between the user equipment 200 and other user equipments. For example, the scheduler 126 may determine a transport format TF for the transport block. The transport format TF may include a Transport Block Size TBS, Modulation and Coding Scheme MCS, antenna mapping, and the like. The scheduler 126 may control the MAC block 122 according to the transport block size TBS of the determined transport format TF and control the PHY block 124 according to the transport block size TBS and antenna mapping of the TF. For example, the wireless communication system 10 may define a quadrature phase-shift keying QPSK (or 4QAM), 16QAM, 64QAM, 256QAM and 1024QAM as modulation schemes. The modulation schemes may be represented as a modulation order MO of the QAM. Also, the wireless communication system 10 may define 16 to 105528, or more, as transport block sizes TBSs that represent a size of information bits that may be transmitted.

A person of ordinary skill in the art should understands that in the base station 100 and the user equipment UE 200 as shown, either the base station 100 and/or the user equipment 200 may utilize a separate receiver and a transmitter rather than a transceiver 140, 240. In addition, the base station 100 and/or the user equipment 200 may have more than one transceiver, or receiver and a transmitter. For example, a smartphone may have a transceiver for communication with a base station of a cellular network. However, a smartphone may also use, for example, Bluetooth, and/or WiFi for respective operations, and have additional transceivers (and antennas) for these various protocols with devices, such as, for example, speakers, a headset, payment systems, etc.

In some embodiments of the inventive concept, the transport format TF may include a sub-carrier spacing SCS, and the scheduler 126 may control the PHY block 124 according to the sub-carrier spacing SCS of the determined transport format TF. For example, the wireless communication system 10 may define 15 kHz, 30 kHz, 60 kHz, 120 kHz, and 240 kHz as the sub-carrier spacing SCS. The sub-carrier spacing SCS may be related to the transport block size TBS and the modulation scheme.

In some embodiments of the inventive concept, the transport format TF may include a number of symbols per transmission time interval TTI and the scheduler 126 may determine the PHY block 124 according to the number of symbols per transmission time interval TTI of the determined transport format TF. For example, the wireless communication system 10 may define 1 to 14 as being the symbol count per slot N_SYM. The symbol count per slot N_SYM may be related to the transport block size TBS and the modulation scheme.

In some embodiments of the inventive concept, the transport format TF may include a maximum bandwidth per component carrier CC and the scheduler 126 may control the PHY block 124 according to the value of the maximum bandwidth per component carrier CC of the determined transport format TF. For example, the wireless communication system 10 may define 100 MHz and 400 MHz as the maximum bandwidths according to the component carrier CC. The maximum bandwidth may be related to the transport block size TBS and the modulation scheme.

In some embodiments of the inventive concept, the transport format TF may include a number of subcarriers per physical resource block PRB, and the scheduler 126 may control the PHY block 124 according to the number of subcarriers per physical resource block PRB of the determined transport format TF. For example, the wireless communication system 10 may define values before and after 12 as the number of subcarriers per a plurality of physical resource blocks PRBs. The number of subcarriers per physical resource block PRB may be related to the transport block size TBS and the modulation scheme.

With continued reference to FIG. 1, the scheduler 126 may transmit at least one parameter according to the determined transport format TF to the user equipment 200 over the downlink DL 14. The user equipment 200 may detect a transport format TF of a signal (e.g., a signal of a SCH region) that the base station 100 transmits over the downlink DL 14 based on the received at least one parameter and process the received signal according to the detected transport format TF. A parameter may have a value directly indicating communication configurations included in the transport format TF, such as a modulation order MO, the transport block size TBS, the number of symbols per time transmission interval TTI, the maximum bandwidth per CC, and the number of subcarriers per PRB and may have a value indirectly indicating the transport format TF, e.g., a value capable of deriving the transport format TF. The at least one parameter according to the transport format TF may be provided to the user equipment 200 through downlink control information DCI of the PHY layer in some embodiments of the inventive concept, and may be provided to the user equipment 200 through an upper layer, e.g., MAC or Radio Resource Control RRC signaling in some embodiments.

As shown in FIG. 1, the user equipment 200 may include a signal processor 220, a transceiver 240, and an antenna 260. The transceiver 240 may receive signals through the downlink DL 14 and the antenna 260 and may transmit signals through the antenna 260 and the uplink UL 12. The antenna 260 may be an antenna array.

Similar to the base station 100, the signal processor 220 of the user equipment 200 may include a MAC block 222 and a PHY block 224. The MAC block 222 and the PHY block 224 may perform operations corresponding to the MAC layer and the PHY layer of the wireless communication system 10, respectively. For example, the PHY block 224 may perform antenna demapping, demodulation, descrambling, decoding, cyclic redundancy CRC check, etc. for the downlink DL 14. Although shown as being separate blocks in FIG. 1, in some embodiments, the MAC block 222 and the PHY block 224 may be implemented as a unit.

The controller 226 may obtain at least one parameter according to the transport format TF determined by the scheduler 126 of the base station 100 and the controller 226 may detect the transport format TF from the obtained parameter. The controller 226 may control the PHY block 224 according to a modulation and coding scheme MCS of the detected transport format TF. The PHY block 224 may process (e.g. demodulate) a signal under control of the controller 226. The controller 226 may control the MAC block 222 according to the transport block size TBS of the detected transport format TF. The MAC block 222 may process the signal under control of the controller 226.

As described below, according to example embodiments of the inventive concept, the base station 100 and the user equipment 200 may efficiently share the transport format TF in various manners. Accordingly, the efficiency of the wireless communication system 10 may be increased by adaptively utilizing an optimal transport format TF, e.g., an optimal communication configuration.

Figure 2:
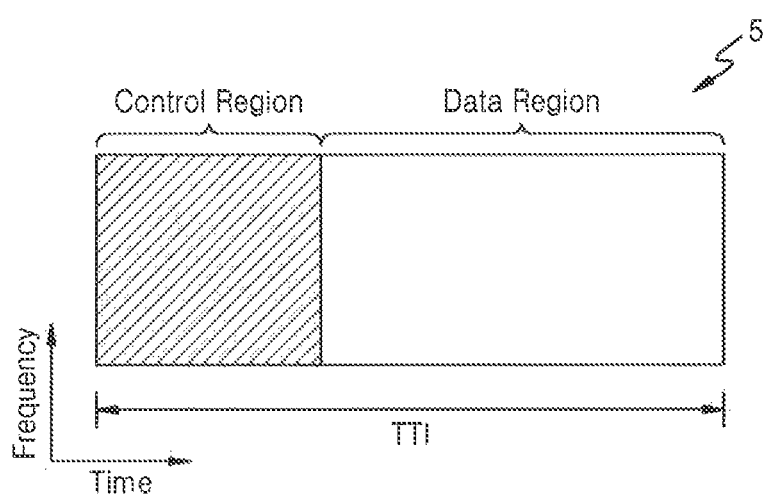
FIG. 2 is a block diagram illustrating an example of a transmission time interval transmitted through a downlink of FIG. 1, in accordance with an example embodiment of the inventive concept.

FIG. 2 is a block diagram illustrating an example of a transmission time interval TTI 5 transmitted through the downlink DL 14 of FIG. 1 in accordance with an example embodiment of the inventive concept. In the wireless communication system 10, the downlink DL 14 data may be transmitted in TTI units, and one TTI unit may be defined as a time interval including a plurality of symbols (e.g., OFDM symbols). For example, a TTI in LTE may be a sub-frame having a length of 1 ms, and a TTI in 5G may be a scalable TTI. Hereinafter, FIG. 2 will be described with reference to FIG. 1.

Referring to FIG. 2, the TTI 5 may include a two-time region multiplexed by Time Division Multiplexing (TDM), e.g., a control region for transmission of a control channel (e.g., PDCCH, PHICH, etc.) and a data region for transmission of a shared channel (e.g., PDSCH, etc.). For example, the control region may include a plurality of symbols for the control channel, and the data region may include remaining symbols for the shared channel.

The control region may include information about the downlink DL 14. For example, in an LTE system, the control region may include a physical downlink control channel (PDCCH) including a location of a PDSCH and downlink control information DCI, a Physical Control Format Indicator Channel (PCFICH) indicating a number of OFDM symbols included in the control region, and a Physical Hybrid-ARQ Indicator Channel (PHICH) including a response signal to an uplink Hybrid Automatic Repeat Request (HARQ) Acknowledgment (ACK)/Negative-Acknowledgment (NACN) signal. The downlink control information DCI transmitted through the PDSCH may include uplink resource allocation information and downlink resource allocation information and may include parameters for sharing the transport format TF as described above with reference to FIG. 1.

Figure 3A:
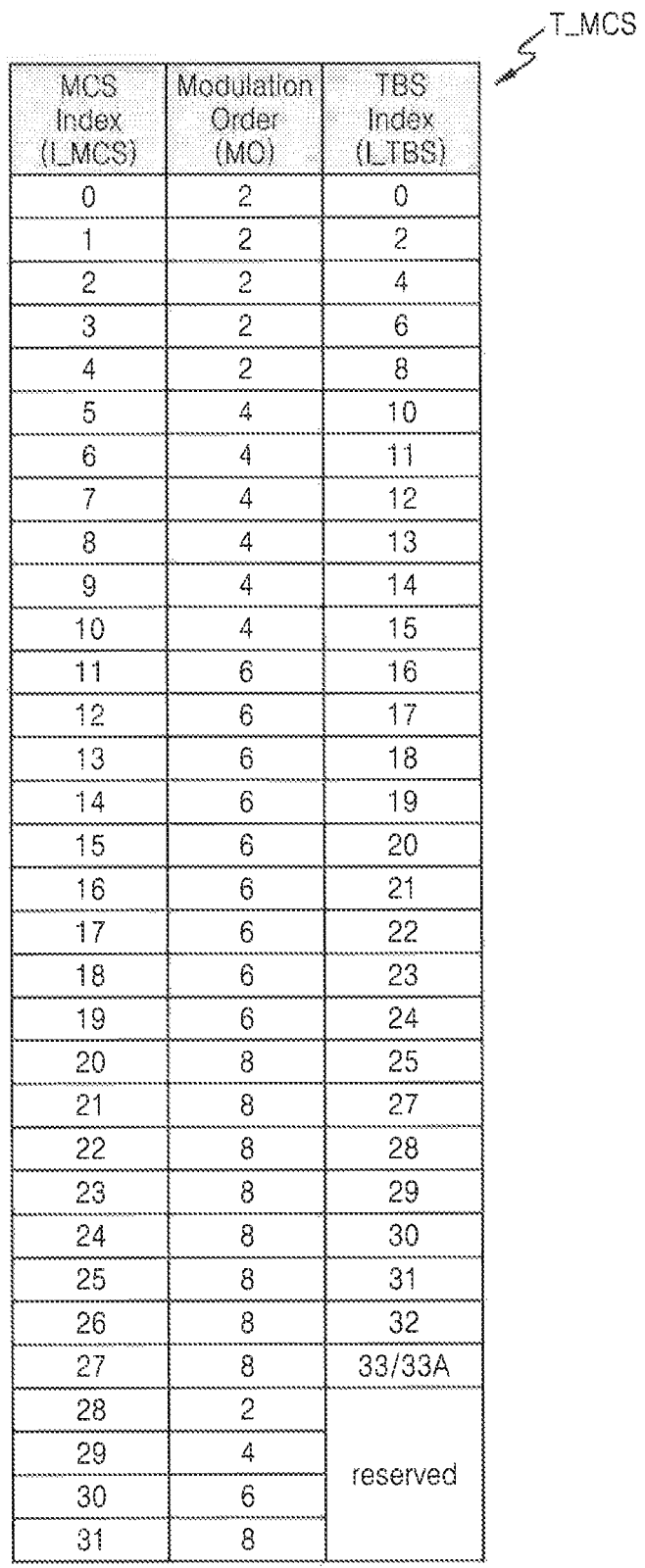

FIGS. 3A and 3B illustrate examples of a table used to share a transport format TF in an LTE system. Specifically, FIG. 3A shows a part of a MCS table T_MCS, and FIG. 3B shows a part of a TBS table T_TBS. Hereinafter, FIGS. 3A and 3B will be described with reference to FIG. 1.

The scheduler 126 may determine one of a plurality of modulation schemes for the downlink DL 14 based on a channel state of the downlink DL 14. For example, the scheduler 126 may increase a bandwidth efficiency by adopting a high modulation order MO in a case where the channel state of the downlink DL 14 is good, while the scheduler 126 may maintain a robust transmission by adopting a low modulation order MO to overcome the channel state in a case where the channel state of the downlink DL 14 is not good. Thus, a method of adjusting the modulation and coding scheme MCS according to the channel state may be referred to as link adaptation. The link adaptation may be implemented by adjusting the MCS to enhance a transmission rate of a wireless system adaptively to a state of a wireless channel varying over time.

Referring to FIG. 3A, the MCS table T_MCS may include MCS indexes I_MCS of 0 to 31. The MCS indexes I_MCS of 0 to 28 of the MCS table T_MCS may be used for HARQ initial transmission. The MCS indexes I_MCS of 29 to 31 may be used for HARQ retransmission. Each of the MCS indexes I_MCS may correspond to one of three different modulation schemes. For example, as shown in FIG. 3A, the MCS indexes I_MCS of 0 to 4 may correspond to QPSK, the MCS indexes I_MCS of 5 to 10 may correspond to 16QAM, the MCS indexes I_MCS of 11 to 19 may correspond to 64QAM, and the MCS indexes I_MCS of 20 to 27 may correspond to 256QAM. As such, a plurality of MCS indexes I_MCS corresponding to the same modulation scheme may be present, which means that each of the MCS indexes I_MCS corresponding to the same modulation scheme may use a code of different code rate. Also, the MCS indexes I_MCS of 28 to 31 of the MCS table T_MCS may be used to distinguish a modulation scheme used for HARQ retransmission. As shown in FIG. 3A, QPSK, 16QAM, 64QAM and 256QAM may be used for HARQ retransmission. As a result, the MCS table T_MCS may support up to 256QAM. Also, as shown in FIG. 3A, the MCS table T_MCS may include TBS indexes I_TBS corresponding to the MCS indexes I_MCS. The TBS index I_TBS may be used to detect a TBS as described below with reference to FIG. 3B.

The use of the MCS table T_MCS of FIG. 3A may be restricted in a case where a modulation scheme specified in the wireless communication system 10 changes or a parameter underlying the modulation scheme changes. For example, the use of the MCS table T_MCS of FIG. 3A may be restricted in a case where an additional modulation order MO such as 1024QAM and adjustable sub-carrier spacing SCS are added according to a 5G system. Further, due to the restricted MCS table T_MCS, it may not be easy to configure an optimal MCS in consideration of the parameter.

Referring to FIG. 3B, the TBS table T_TBS may include TBSs corresponding to pairs of TBS indexes I_TBS and a physical resource block count N_PRB. In the LTE system, since a size of a transmission resource may be allocated from 1 PRB to 110 PRBs to the user equipment 200, 110 TBS may be defined for each TBS index I_TBS. FIG. 3B shows TBSs according to the TBS indexes I_TBS of 0 to 10 and the physical resource block count N_PRB of 1 to 1, as part of the TBS table T_TBS.

In a case where the physical resource block count N_PRB specified in the wireless communication system 10 changes, the use of the TBS table T_TBS of FIG. 3B may be restricted. For example, in a case where the physical resource block count N_PRB (e.g., 275) larger than 110 according to the 5G system is defined, the use of the TBS table T_TBS of FIG. 3B may be restricted. Also, due to the restricted TBS table T_TBS, it may not be easy to configure an optimal TBS in consideration of the parameter.

Figure 4:
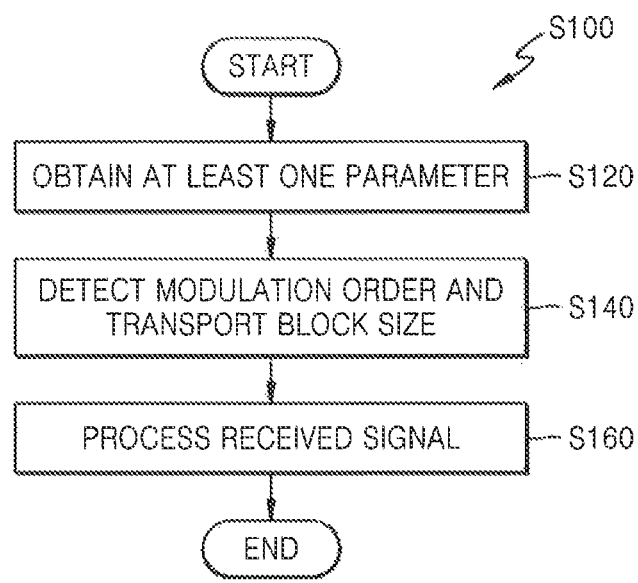
FIG. 4 is a flowchart illustrating a wireless communication method in accordance with an example embodiment of the inventive concept.

FIG. 4 is a flowchart illustrating a wireless communication method in accordance with an example embodiment of the inventive concept. For example, a method S100 of FIG. 4 may be performed by the signal processor 220 for processing a signal received over the downlink DL 14 of FIG. 1. As shown in FIG. 4, the method S100 of FIG. 4 may include a plurality of operations S120, S140, and S160. Hereinafter, FIG. 4 will be described with reference to FIG. 1.

In operation S120, an operation of acquiring at least one parameter may be performed. The at least one parameter may be transmitted to the user equipment 200 to share a transport format TF determined by the scheduler 126 of the base station 100 with the user equipment 200, as described above with reference to FIG. 1. The controller 226 may obtain the at least one parameter provided from the base station 100. In some embodiments, the at least one parameter may be provided to the user equipment 200 through downlink control information DCI of a PHY layer and may be provided to the user equipment 200 through an upper layer such as MAC or RRC signaling.

In some embodiments, the at least one parameter may include sub-carrier spacing SCS. As described with reference to FIG. 1, the wireless communication system 10 may define a plurality of sub-carrier spacing SCSs and the base station 100 may transmit a parameter indicating one sub-carrier spacing SCS to the user equipment 200. The controller 226 may obtain the sub-carrier spacing SCS and detect MCS and a transport block size TBS based on the sub-carrier spacing SCS in subsequent operations.

In operation S140, an operation of detecting a modulation order MO and the transport block size TBS may be performed. For example, the controller 226 may detect the modulation order MO and the transport block size TBS based on the at least one parameter obtained in operation S120. Examples of operation S140 will be described below with reference to FIGS. 5 through 8.

In operation S160, an operation of processing the received signal may be performed. For example, the controller 226 may control the PHY block 224 and the MAC block 222 based on the modulation order MO and the transport block size TBS detected in operation S140. The PHY block 224 and the MAC block 222 may process the signal provided from the transceiver 240 under control of the controller 226. For example, the PHY block 224 may demodulate the signal based on the detected modulation order MO, and the MAC block 222 may generate a MAC service data unit (SDU) based on the detected transport block size TBS.

Figure 5:
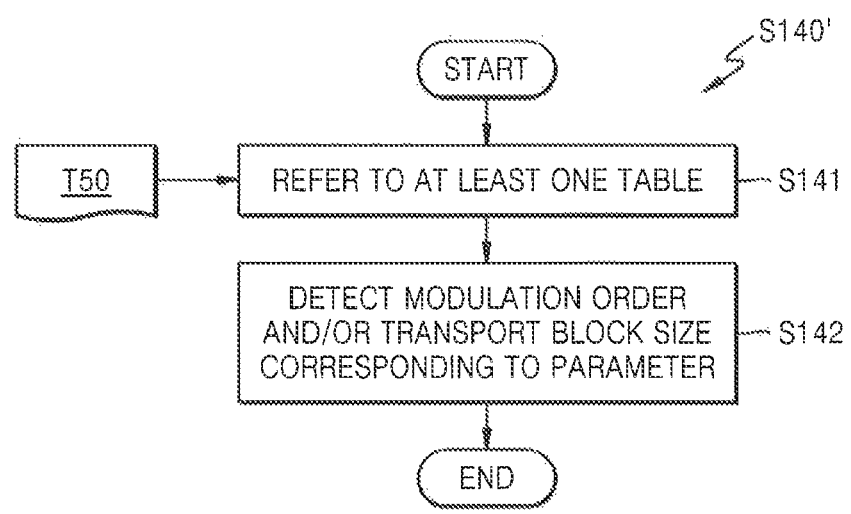
FIG. 5 is a flowchart illustrating an example of operation S140 of FIG. 4 in accordance with an example embodiment of the inventive concept.

FIG. 5 is a flowchart illustrating an example of operation S140 of FIG. 4 in accordance with an example embodiment of the inventive concept. As described with reference to FIG. 4, in operation S140' of FIG. 5, an operation of detecting a modulation order MO and a transport block size TBS may be performed, and as shown in FIG. 5, in operation S140' may include operations S141 and S142. In some embodiments, operation S140' of FIG. 5 may be performed by the controller 226 of FIG. 1. Hereinafter, FIG. 5 will be described with reference to FIG. 1.

In operation S141, an operation referring to at least one table may be performed. For example, the controller 226 may refer to a table T50 by accessing a memory storing the table T50. The table T50 may be defined by the wireless communication system 10. The base station 100 and the user equipment 200 may commonly store the table T50. As described later with reference to FIG. 6 and the like, the table T50 may include information corresponding to parameters. The controller 226 may refer to a table or a plurality of tables in some embodiments. Examples of the table T50 will be described later with reference to FIGS. 6, 7A to 7C and 8.

In operation S142, an operation of detecting a modulation order MO and/or a transport block size TBS corresponding to a parameter may be performed. In some embodiments, the controller 226 may detect the modulation order MO corresponding to a pair of the MCS index I_MCS and the sub-carrier spacing SCS as the parameter by referring to the table T50. In some embodiments, the controller 226 may detect the transport block size TBS corresponding to the physical resource block count N_PRB as the parameter by referring to the table T50.

FIG. 6 is a diagram illustrating an example of the table T50 of FIG. 5 in accordance with an example embodiment of the inventive concept. Specifically, FIG. 6 shows an MCS table T_MCS' including modulation orders MOs and TBS indexes I_TBS corresponding to pairs of an MCS index I_MCS and sub-carrier spacing SCS. It is noted that the MCS table T_MCS of FIG. 6 is only an example, and sub-carrier spacing SCS, modulation order MO and TBS index I_TBS that are different from shown in FIG. 6 may be possible.

Compared to the MC Table T_MCS of FIG. 3A, the MCS table T_MCS' of FIG. 6 may include the modulation order MO and the TBS index I_TBS according to the sub-carrier spacing SCS as well as the MCS index I_MCS. As described above with reference to FIG. 1, the sub-carrier spacing SCS may be related to a modulation scheme and a transport block size TBS. For example, when the sub-carrier spacing SCS increases, interferences between adjacent subcarriers may be reduced, and thus a modulation scheme of a high modulation order MO may be used, while when the sub-carrier spacing SCS decreases, the interferences between the subcarriers may increase, and thus a modulation scheme of a low modulation order MO may be used. Also, when the sub-carrier spacing SCS increases, the number of subcarriers included in a maximum bandwidth of a component carrier CC may be reduced, thereby reducing the transport block size TBS, while when the sub-carrier spacing SCS is reduced, the number of subcarriers included in the maximum bandwidth of the component carrier CC may increase, and thus the transport block size TBS may increase.

Figure 7A:
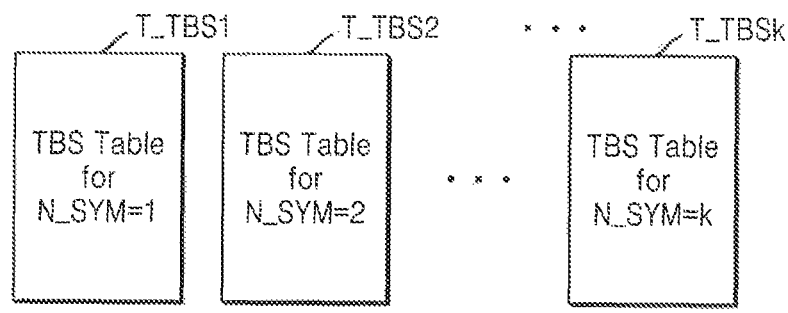
FIGS. 7A through 7C are diagrams illustrating examples of the table of FIG. 5 in accordance with example embodiments of the inventive concept.
Figure 7B:
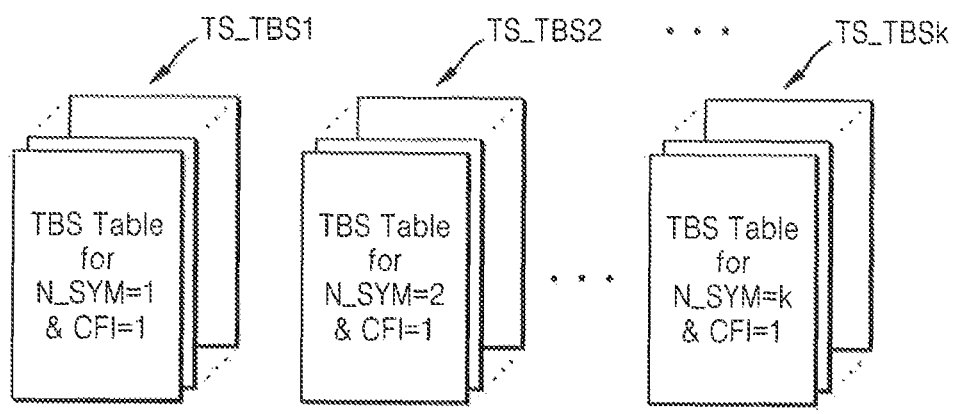
Figure 7C:
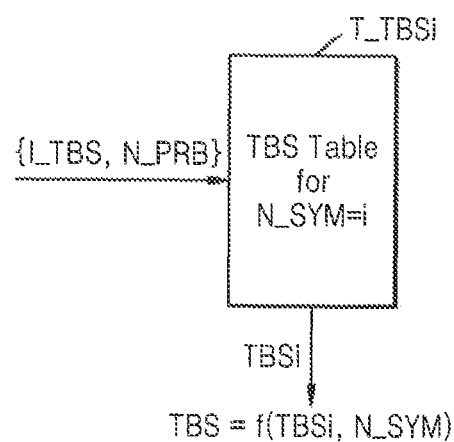

FIGS. 7A through 7C are diagrams illustrating examples of the table T50 of FIG. 5 in accordance with example embodiments of the inventive concept. Specifically, FIGS. 7A through 7C show tables for detecting a transport block size TBS using a TBS table in a wireless communication system in which the number of symbols per TTI varies. In FIGS. 7A through 7C, the number of symbols per TTI may refer to a symbol count per slot N_SYM. The symbol count per slot N_SYM may range from 1 to k (k is an integer greater than 1).

Referring to FIG. 7A, in some embodiments, a plurality of TBS tables T_TBS1, T_TBS2, . . . , T_TBSk corresponding to the symbol count per each of a plurality of slots N_SYM may be used. For example, the controller 226 of FIG. 1 may obtain the symbol count per slot N_SYM and select one TBS table corresponding to the symbol count per slot N_SYM from among the plurality of TBS tables T_TBS1, T_TBS2, . . . , T_TBSk. Then, the controller 226 may detect the TBS corresponding to the detected TBS index I_TBS and the physical resource block count N_PRB from the selected TBS table. In some embodiments, 14 TBS tables may be used according to a range of the symbol count per 1 to 14 slots N_SYM. Further, in some embodiments, a wireless communication system 10 may define the symbol count per slot N_SYM as predefined values, instead of defining the symbol count per slot N_SYM that sequentially increases by 1 and the TBS tables corresponding to the symbol count per slot N_SYM may be used.

Referring to FIG. 7B, in some embodiments of the inventive concept, a plurality of TBS table groups TS_TBS1, TS_TBS2, . . . , TS_TBS2 corresponding to the symbol count per each of a plurality of slots N_SYM and a plurality of control format indicators CFIs may be used. For example, the TBS tables included in the first TBS table group TS_TBS1 may include TBSs optimized according to control format indicators CFI values in a case where the symbol count per slot N_SYM is 1. The controller 226 of FIG. 1 may obtain the symbol count per slot N_SYM and may select a jth TBS table group TS_TBSj (1≤j≤k) corresponding to the symbol count per slot N_SYM. The controller 226 may obtain the control format indicators CFI, select the TBS table T_TBS corresponding to the control format indicators CFI from among the TBS tables included in the selected jth TBS table group TS_TBSj, and detect a transport block size TBS corresponding to the TBS index I_TBS and a physical resource block count N_PRB with reference to the selected TBS table T_TBS. Thus, by referring to a plurality of tables, the number of parameters transmitted from the base station 100 to the user equipment 200 may be reduced, and thus overhead required for transmission of the parameters, e.g., overhead for decoding/decoding downlink control information DCI may be reduced.

Referring to FIG. 7C, in some embodiments of the inventive concept, at least one TBS table and function may be used. For example, as shown in FIG. 7C, a function f having a TBS table T_TBSi corresponding to the symbol count per slot N_SYM in which i(1≤i≤k), and a transport block size TBSi of the TBS table T_TBSi and the symbol count per slot N_SYM as arguments may be used. The controller 226 may then detect the transport block size TBSi corresponding to the detected TBS index I_TBS and the physical resource block count N_PRB by referring to the TBS table T_TBSi. The controller 226 may then calculate the transport block size TBS from the detected transport block size TBSi and the obtained symbol count per slot N_SYM based on the function f.

In some embodiments, the function f may monotonically increase with respect to the symbol count per slot N_SYM. The number of resource elements RE that may be used as data may be determined according to a value of the symbol count per slot N_SYM. A code rate CR may be generally inversely proportional to the number of resource elements RE and the average decoding performance in the same channel environment may be enhanced as the code rate CR is smaller. Accordingly, as the symbol count per slot N_SYM increases, the transport block size TBS may increase linearly or nonlinearly. For example, the TBS table T_TBSi may correspond to the symbol count per slot N_SYM (e.g., i=1) and the function f may be defined as a power of the transport block size TBSi detected from the TBS table T_TBSi and the symbol count per slot N_SYM. It will be understood that although FIG. 7C illustrates an example using one TBS table T_TBSi and one function f, in some embodiments, two or more TBS tables and/or two or more functions may be used.

Figure 8:
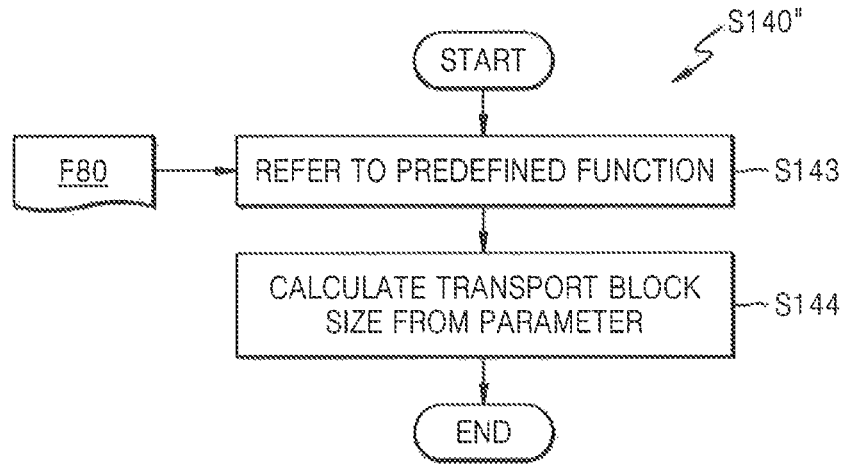
FIG. 8 is a flowchart illustrating an example of operation S140 of FIG. 4 in accordance with an example embodiment of the inventive concept.

FIG. 8 is a flowchart illustrating an example of operation S140 of FIG. 4 in accordance with an example embodiment of the inventive concept. As described above with reference to FIG. 4, in operation S140" of FIG. 8, an operation of detecting a modulation order MO and a transport block size TBS may be performed. Operation S140" may include operations S143 and S144. In some embodiments, operation S140" of FIG. 8 may be performed by the controller 226 of FIG. 1. Hereinafter, FIG. 8 will be described with reference to FIG. 1.

In operation S143, an operation referring to a predefined function may be performed. For example, the controller 226 may refer to a function F80 having as an argument at least one parameter defining a transport format TF. The function F80 may be defined by the wireless communication system 10. The base station 100 and the user equipment 200 may commonly store the function F80. For example, the function F80 may have at least one of values directly defining the transport format TF such as the sub-carrier spacing SCS, the modulation order MO, the CFI, the symbol count per slot N_SYM, and the physical resource block count N_PRB as an argument and may have at least one of values indirectly defining the transport format TF such as an MCS index I_MCS, a TBS index I_TBS, or the like. In some embodiments, the controller 226 may refer to two or more functions.

In operation S144, an operation of calculating a transport block size TBS from a parameter may be performed. For example, the controller 226 may calculate the transport block size TBS from a function g defined as shown in [Equation 1] below.

$$TBS = g(I\_MCS, MO, SCS, CFI, N\_SYM, N\_PRB, I\_TBS) \qquad [\text{Equation 1}]$$

As shown in [Equation 1], the transport block size TBS may be calculated as the function g of the MCS index I_MCS, the modulation order MO, the sub-carrier spacing SCS, the CFI, the symbol count per slot N_SYM, and the TBS index I_TBS. As described above with reference to FIG. 3B, the number of transport block sizes TBS defined according to the TBS index I_TBS and the physical resource block count N_PRB may be large. Also, the physical resource block count N_PRB defined by the wireless communication system 10 may increase, and accordingly, a range of the transport block size TBS may remarkably increase. Also, the transport block size TBS may be further subdivided to configure an optimized transport block size TBS according to the symbol count per slot N_SYM and the CFI. Instead of increasing the size of the TBS table, the range and subdivision of the transport block size TBS may be achieved by calculating the transport block size TBS from a function of parameters related to the transport block size TBS.

Figure 9:
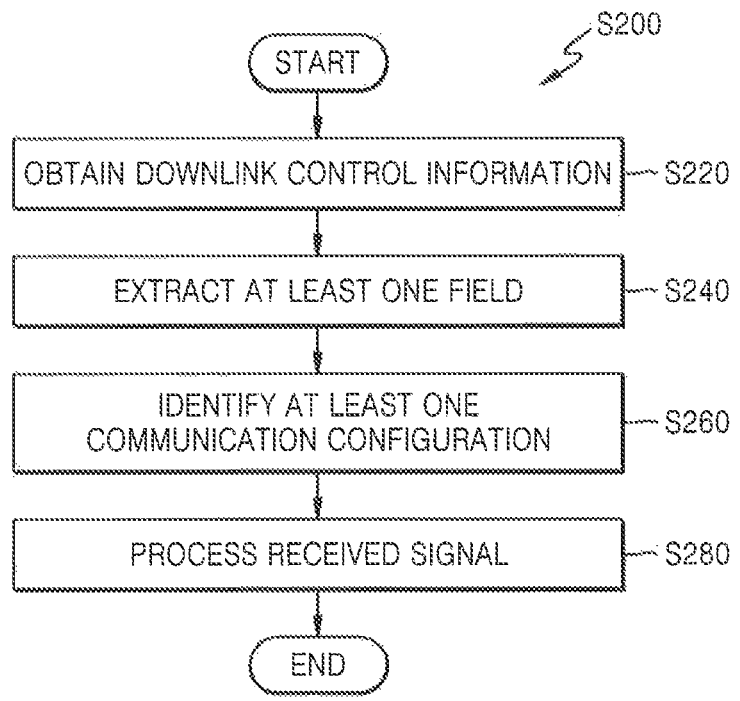
FIG. 9 is a flowchart illustrating a wireless communication method in accordance with an example embodiment of the inventive concept.

FIG. 9 is a flowchart illustrating a wireless communication method in accordance with an example embodiment of the inventive concept. Compared with the method S100 of FIG. 4, a method S200 of FIG. 9 may identify at least one communication configuration included in a transport format TF from downlink control information DCI. As shown in FIG. 9, the method S200 of FIG. 9 may include a plurality of operations S220, S240, S260, and S280. In some embodiments, the method S200 of FIG. 9 may be performed by the signal processor 220 for processing of signals received through the downlink DL 14 of FIG. 1. Hereinafter, FIG. 9 will be described with reference to FIG. 1, and a redundant description between FIG. 9 and FIG. 1 will be omitted.

In operation S220, an operation of obtaining the downlink control information DCI may be performed. For example, the controller 226 may receive the downlink control information DCI included in a control region of FIG. 2 from the PHY block 224.

In operation S240, an operation of extracting at least one field may be performed. For example, the downlink control information DCI may include at least one field corresponding to at least one of communication configuration included in the transport format TF, e.g., at least one of the modulation order MO, the physical resource block count N_PRB, and the transport block size TBS and the controller 226 may extract the at least one field from the downlink control information DCI.

In operation S260, an operation of identifying the at least one communication configuration may be performed. The field extracted in operation S240 may directly indicate a value of the communication configuration in some embodiments and may indirectly indicate the value of the communication configuration in some embodiments. The controller 226 may identify the communication configuration from the field. In the present specification, "identification" may be referred to as directly deriving a result from an input without reference to a lookup table. Then, an operation of processing the received signal according to the communication configuration identified in operation S280 may be performed.

With regard to the flowchart of FIG. 9, the identifying of the at least one communication configuration may include identifying of the transport block size including calculating the transport block size from the value of the first field, based on a predefined function, and the predefined function may be a monotone increasing function having a part with a slope greater than 1.

Figure 10:
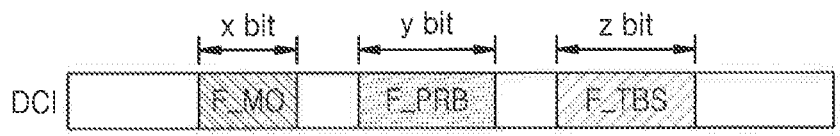
FIG. 10 is a diagram illustrating downlink control information in accordance with an example embodiment of the inventive concept.

FIG. 10 is a diagram illustrating downlink control information DCI in accordance with an example embodiment of the inventive concept. As described above with reference to FIG. 9, the downlink control information DCI may include at least one field corresponding to at least one communication configuration included in the transport format TF.

Referring to FIG. 10, the downlink control information DCI may include a first field F_MO corresponding to the modulation order MO and having x bits, a second field F PRB corresponding to the physical resource block count N_PRB and having y bits, and a third field F_TBS corresponding to the transport block size TBS and having z bits. Although the downlink control information DCI in FIG. 10 includes fields corresponding to all the modulation order MO, the physical resource block count N_PRB, and the transport block size TBS, in some embodiments, the information DCI may include only fields corresponding to some of the modulation order MO, the physical resource block count N_PRB, and the transport block size TBS.

In some embodiments of the inventive concept, a field included in the downlink control information DCI may directly indicate a communication configuration. For example, the first field F_MO may have 3 bits (e.g., x=3) to represent QPSK (or 4QAM), 16QAM, 64QAM, 256QAM, and 1024QAM defined by a 5G system, have 10 bits (e.g., y=10) to indicate the maximum number of 550 physical resource blocks N_PRB defined by the 5G system, and "$\log_2(\text{TBSmax})$" bits derived from a maximum value TBSmax of the transport block size TBS defined by the 5G system.

In some embodiments of the inventive concept, a field included in the downlink control information DCI may indirectly indicate a communication configuration. For example, the number of bits z of the third field F_TBS is limited due to a large range of the transport block size TBS, while the transport block size TBS may be derived from a value of the third field F_TBS according to a predefined rule. For example, in a case where, for example, a, b, c, d, and e are bits included in the third field F_TBS, the transport block size TBS may be derived as shown in [Equation 2] below.

$$TBS = 2a * 3b * 5c * 7d * 11e * \ldots \qquad \text{[Equation 2]}$$

In some embodiments of the inventive concept, the third field F_TBS may represent the TBS index I_TBS. In other words, compared with the examples of FIGS. 3A and 3B, the TBS index I_TBS may be directly transmitted to the user equipment 200 through the downlink control information DCI instead of being detected from a TBS table or the like. In some embodiments of the inventive concept, the transport block size TBS may be detected using the TBS tables T_TBS1, T_TBS2, . . . , T_TBSk corresponding to the symbol count per slot N_SYM. Also, in some embodiments of the inventive concept, the transport block size TBS may be detected using one TBS table T_TBSi and the function f, as described above with reference to FIG. 7C.

Figure 11:
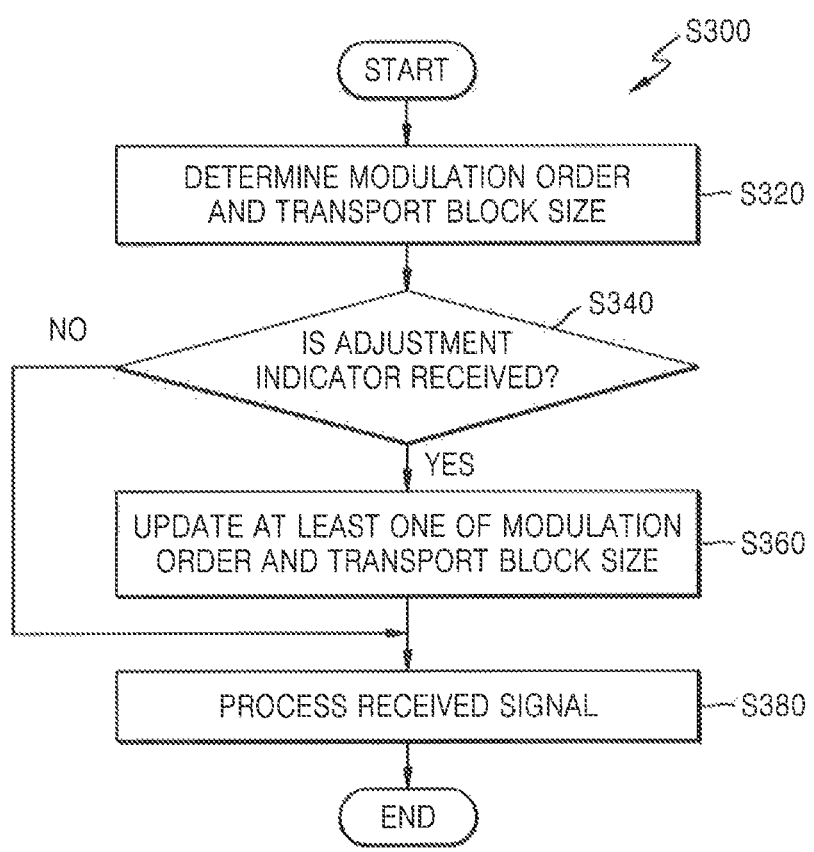
FIG. 11 is a flowchart illustrating a wireless communication method in accordance with an example embodiment of the inventive concept.

FIG. 11 is a flowchart illustrating a wireless communication method in accordance with an example embodiment of the inventive concept. Compared with the method S100 of FIG. 4 and the method S200 of FIG. 9, a method S300 of FIG. 11 may change the transport format TF using the downlink control information DCI including an adjustment indicator. As shown in FIG. 11, the method S300 of FIG. 11 may include a plurality of operations S320, S340, S360, and S380. In some embodiments of the inventive concept, the method S300 of FIG. 11 may be performed by the signal processor 220 for processing of signals received through the downlink DL 14 of FIG. 2. Hereinafter, FIG. 11 will be described with reference to FIG. 1, and any description of FIG. 11 that is redundant with regard to the description of FIGS. 1 and 4 will be omitted.

In operation S320, there may be a determining of the modulation order MO and the transport block size TBS. For example, the controller 226 of the user equipment 200 may use the tables T_MCS and T_TBS respectively shown in FIGS. 3A and 3B, or determine the modulation order MO and the transport block size TBS in accordance with the example embodiments of the inventive concept described above.

Figure 12:
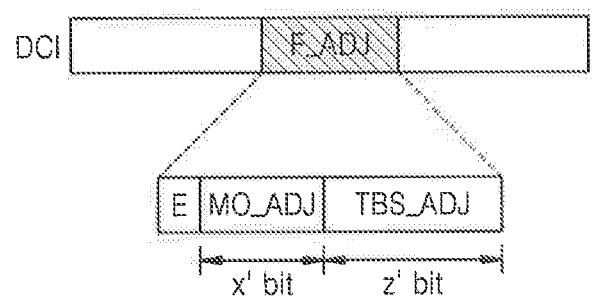
FIG. 12 is a diagram illustrating downlink control information in accordance with an example embodiment of the inventive concept.

In operation S340, an operation of determining whether the adjustment indicator is received may be performed. For example, as shown in FIG. 12, the downlink control information DCI may include a field corresponding to the adjustment indicator. The field corresponding to the adjustment indicator may include a bit indicating whether the adjustment indicator is valid. The controller 226 may determine whether the adjustment indicator is received based on the bit indicating validity. An example of the adjustment indicator will be subsequently described with reference to FIG. 12. In a case where it is determined at operation S340 that the adjustment indicator is received, operation S360 may be performed subsequently. However, in a case where it is determined at operation S340 that the adjustment indication is not received, operation S380 may be performed subsequently.

In operation S360, an operation of updating at least one of the modulation order MO and the transport block size TBS may be performed. For example, the controller 226 may change at least one of the modulation order MO and the transport block size TBS determined in operation S320 based on the adjustment indicator. For example, the controller 226 may increase or decrease the modulation order MO and increase or decrease the transmission block size TBS based on the adjustment indicator.

In operation S380, an operation of processing the received signal according to the updated modulation order MO and the transport block size TBS may be performed.

FIG. 12 is a diagram illustrating the downlink control information DCI in accordance with an example embodiment of the inventive concept. As shown in FIG. 12, the downlink control information DCI may include an adjustment field F_ADJ corresponding to an adjustment indicator. The adjustment field F_ADJ corresponding to the adjustment indicator may include a validity bit E indicating whether the adjustment indicator is valid. In addition, the adjustment field F_ADJ includes a first adjustment field MO_ADJ corresponding to the modulation order MO and having x' bits, and a second adjustment field TBS_ADJ corresponding to the transport block size TBS and having z' bits. In some embodiments of the inventive concept, the adjustment field F_ADJ corresponding to the adjustment indicator may be different than shown in FIG. 12, and may include only one of the first and second adjustment fields MO_ADJ and TBS_ADJ.

According to an example embodiment of the inventive concept, the adjustment indicator may indicate at least one of an increase/decrease, a change amount, and a change value of the modulation order MO. In some embodiments of the inventive concept, the first adjustment field MO_ADJ may include at least one bit that indicates the increase/decrease of the modulation order MO, and the controller 226 may increase or decrease the modulation order MO by a predefined offset according to a value of the first adjustment field MO_ADJ. In some embodiments of the inventive concept, the first adjustment field MO_ADJ may include at least one bit indicating the change amount in the modulation order MO, and the controller 226 may be configured to reflect the amount of change to the modulation order MO according to the value of the modulation field MO_ADJ. In some embodiments of the inventive concept, the first adjustment field MO_ADJ may include at least one bit indicating the change value of the modulation order MO, and the controller 226 may update the modulation order MO as the change value according to the value of the first adjustment field MO_ADJ.

According to an example embodiment of the inventive concept, the adjustment indicator may include at least one of an increase/decrease, a change amount, and a change value of the transport block size TBS. In some embodiments of the inventive concept, the second adjustment field TBS_ADJ may include at least one bit indicating an increase/decrease of the transport block size TBS, and the controller 226 of the user equipment 200 may increase or decrease the transport block size TBS by a predefined offset according to a value of the second adjustment field TBS_ADJ. In still some embodiments of the inventive concept, the second adjustment field TBS_ADJ may include at least one bit indicating the change amount in the transport block size TBS, and the controller 226 may reflect the amount of change to the transport block size TBS according to the value of the modulation field MO_ADJ. In some embodiments of the inventive concept, the second adjustment field TBS_ADJ may include at least one bit indicating the change value of the transport block size TBS, and the controller 226 may update the transport block size TBS as the change value according to the value of the second adjustment field TBS_ADJ.

Figure 13:
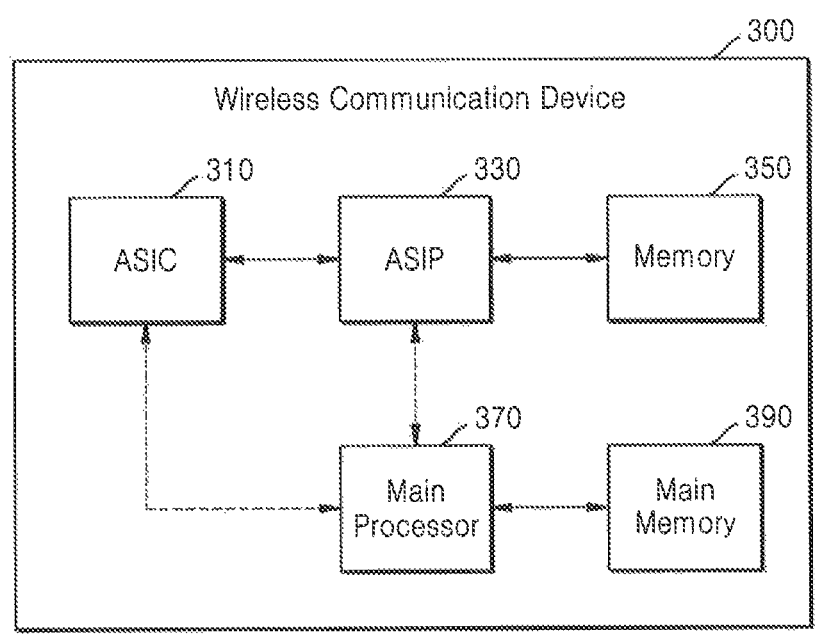
FIG. 13 is an example block diagram of a wireless communication device in accordance with an example embodiment of the inventive concept.

FIG. 13 is an example block diagram of a wireless communication device 300 in accordance with an example embodiment of the inventive concept. As shown in FIG. 13, the radio communication apparatus 50 may include, for example, an application specific integrated circuit (ASIC) 310, an application specific instruction set processor (ASIP) 330, a memory 350, a main processor 370, and a main memory 390. Two or more of the ASIC 310, the ASIP 330, and the main processor 370 may communicate with each other. At least two of the ASIC 310, the ASIP 330, the memory 350, the main processor 370 and the main memory 390 may be embedded in one chip.

The ASIP 330 is an integrated circuit that is customized for a particular use and may support a dedicated instruction set for a particular application and execute instructions included in the instruction set. The memory 350 may communicate with the ASIP 330 and may store a plurality of instructions executed by the ASIP 330 as a non-volatile storage device. For example, the memory 350 may include, but is not limited to, any type of memory that is accessible by the ASIP 53 such as a random access memory (RAM), read-only memory (ROM), tape, magnetic disk, optical disk, volatile memory, non-volatile memory, and a combination thereof.

With continued reference to FIG. 13, the main processor 370 may control the wireless communication device 300 by executing a plurality of instructions. For example, the main processor 370 may control the ASIC 310 and the ASIP 330, and may process data received over a wireless communication network or process a user input to the wireless communication device 300. The main memory 390 may communicate with the main processor 370 and may store a plurality of instructions executed by the main processor 370 as a non-temporary storage device. For example, the main memory 390 may include, but is not limited to, any type of memory that is accessible by the main processor 370 such as a random access memory (RAM), read-only memory (ROM), tape, magnetic disk, optical disk, volatile memory, non-volatile memory, and a combination thereof. In addition, the main processor 370 may be an Advanced Reduced Instruction Set Machine (ARM)-based processor.

The wireless communication method according to the example embodiment of the inventive concept described above may be performed by at least one of the components included in the wireless communication device 300 of FIG. 13. In some embodiments of the inventive concept, at least one of operations of the wireless communication method described above and the signal processor 120 and/or the signal processor 220 of FIG. 1 may be implemented as a plurality of executable instructions stored in the memory 350. In some embodiments of the inventive concept, the ASIP 330 may perform at least one of the operations of the wireless communication method and at least a part of operations of the signal processor 120 and/or the signal processor 220 of FIG. 1 by executing the plurality of instructions stored in the memory 350. In some embodiments of the inventive concept, at least one of the operations of the wireless communication method and the signal processor 120 and/or the signal processor 220 of FIG. 1 may be implemented in a hardware block designed through logic synthesis or the like and included in the ASIC 310. In some embodiments of the inventive concept, at least one of the operations of the wireless communication method the signal processor 120 and/or the signal processor 220 of FIG. 1 may be implemented as a plurality of instructions stored in the main memory 390, and the main processor 370 may perform at least one of the operations of the wireless communication method and at least a part of operations of the signal processor 120 and/or the signal processor 220 of FIG. 1 by executing the plurality of instructions stored in the main memory 390. A person of ordinary skill in the art should understand and appreciate that other configurations are available that are within the spirit of the embodiments of the inventive concept and the scope of the appended claims.

In an embodiment of the inventive concept, for example, the user equipment 200 may detect the Modulating and Coding Scheme (MCS) and Transport Block Size (TBS) from a plurality of tables according to an index received from the base station 100.

In an embodiment of the inventive concept, for example, the user equipment 200 may calculate the MCS/TBS from parameters received from the base station 100 based on a predefined formula.

In an embodiment of the inventive concept, for example, the user equipment 200 may combine one or more look-up tables and a formula to calculate the MCS/TBS.

In an embodiment of the inventive concept, for example, the user equipment 200 identifies the MCS/TBS from the downlink control information (DCI) including the fields of the MCS/TBS.

In an embodiment of the inventive concept, for example, the user equipment 200 may change the MCS/TBS from the DCI including the MCS/TBS adjustment fields.

As described above, the example embodiments of the inventive concept have been disclosed in the drawings and specification. While the embodiments of the inventive concept have been described herein with reference to specific terms, a person of ordinary skill in the art should be understood that the terms have been used only for the purpose of describing the technical idea of the inventive concept and not for limiting the scope of the inventive concept as defined in the claims. Therefore, those skilled in the art will appreciate that various modifications and equivalent embodiments are possible without departing from the scope of the inventive concept.

What is claimed is:

1. A method of processing a signal received over a wireless link, the method comprising:
    obtaining, by a user equipment, at least one parameter of the received signal comprising a sub-carrier spacing of a transport format and a symbol count per slot;
    detecting, by a controller of the user equipment, a transport block size; and
    processing the received signal, based on the transport block size,
    wherein the detecting of the transport block size comprises:
    detecting a reference transport block size corresponding to an obtained physical resource block count and a transport block size index, by referring to a transport block size table; and
    calculating the transport block size from the obtained symbol count per slot and the reference transport block size, based on a predefined function.

2. The method of claim 1, wherein the received signal is transmitted by a base station, and the obtaining of the at least one parameter comprises obtaining a modulation and coding scheme index,
    wherein the method further comprises:
    detecting a modulation order corresponding to the sub-carrier spacing obtained by the user equipment, and
    obtaining a modulation and coding scheme by referring to a modulation and coding scheme table comprising a plurality of modulation orders corresponding to a plurality of pairs of the sub-carrier spacing and the modulation and coding scheme index.

3. The method of claim 2, wherein the modulation and coding scheme table includes a plurality of transport block size indexes corresponding to the plurality of pairs of the sub-carrier spacing and the modulation and coding scheme index, and wherein the method further comprises:
    detecting a transport block size index corresponding to the sub-carrier spacing and the modulation and coding scheme index by referring to the modulation and coding scheme table,
    wherein the obtaining of the at least one parameter further comprises obtaining a physical resource block count, and
    wherein the detecting of the modulation order and the transport block size includes detecting the transport block size based on the obtained physical resource block count and the detected transport block size index.

4. The method of claim 3, wherein the detecting of the transport block size comprises detecting the transport block size corresponding to the obtained physical resource block count and the detected transport block size index by referring to the transport block size table including a plurality of transport block sizes that correspond to a plurality of pairs of the transport block size index and the physical resource block count.

5. The method of claim 4,
    wherein the detecting of the transport block size comprises detecting the transport block size corresponding to the obtained physical resource block count, the detected transport block size index, and the obtained symbol count per slot by referring to a plurality of transport block size tables corresponding to symbol counts per each of a plurality of slots.

6. The method of claim 5, wherein the obtaining of the at least one parameter further comprises obtaining a control format indicator, and
    wherein the detecting of the transport block size comprises detecting the transport block size corresponding to the obtained physical resource block count, the detected transport block size index, the obtained symbol count per slot, and the obtained control format indicator by referring to a plurality of transport block size tables that correspond to a plurality of pairs of the symbol count per slot and the control format indicator.

7. The method of claim 1, wherein the obtaining of the at least one parameter further comprises obtaining at least one of a modulation and coding scheme index, a physical resource block count, and a control format indicator, and
    wherein the detecting of the transport block size comprises calculating the transport block size from at least one of the sub-carrier spacing, the modulation and coding scheme index, the physical resource block count, the symbol count per slot, and the control format indicator, based on a predefined function.

8. The method of claim 1, wherein the predefined function is a monotonically increasing function.

9. A method of processing a signal received over a wireless link from a base station, the method comprising:
    obtaining, by a user equipment, at least one parameter of the received signal comprising a sub-carrier spacing of a transport format, a physical resource block (PRB) count, a symbol count per slot, and a modulation and coding scheme (MCS) index;
    detecting, by a controller of the user equipment, a modulation order corresponding to the sub-carrier spacing, and a transport block size (TBS), based on the at least one parameter of the received signal; and processing the received signal, based on the detecting of the modulation order and the transport block size, wherein, the method further comprises obtaining a MCS scheme by referring to a MCS table comprising a plurality of modulation orders corresponding to a plurality of pairs of the sub-carrier spacing and the MCS index, the MCS table including a plurality of TBS indexes corresponding to the plurality of pairs of the sub-carrier spacing and the MCS index, the method further comprises detecting a TBS index corresponding to the sub-carrier spacing and the MCS index by referring to the MCS table, the detecting of the modulation order and the TBS includes detecting the TBS based on the obtained PRB count and the detected TBS index, the detecting of the TBS comprises detecting the TBS corresponding to the obtained PRB count and the detected TBS index by referring to a TBS table including a plurality of TBSs that correspond to a plurality of pairs of the TBS index and the PRB count, detecting a reference TBS corresponding to the obtained PRB count and the detected TBS index by referring to the TBS table; and the TBS is calculated from the obtained symbol count per slot and the reference TBS, based on a predefined function.

10. The method of claim 9, wherein the predefined function is a monotonically increasing function.

11. A user equipment comprising:

memory; and at least one processor configured to execute instructions read from the memory to:

obtain at least one parameter of the received signal comprising a sub-carrier spacing of a transport format and a symbol count per slot;

detect a transport block size, based at least in part upon the at least one parameter; and process the received signal, based on the transport block size, wherein the detecting by the processor of the transport block size comprises:

detecting a reference transport block size corresponding to an obtained physical resource block count and a transport block size index by referring to a transport block size table; and calculating the transport block size from the obtained symbol count per slot and the reference transport block size, based on a predefined function.

12. The user equipment of claim 11, wherein the predefined function is a monotonically increasing function.

* * * * *